United States Patent
Kroening

(10) Patent No.: US 7,644,408 B2
(45) Date of Patent: Jan. 5, 2010

(54) SYSTEM FOR ASSIGNING AND MONITORING GRID JOBS ON A COMPUTING GRID

(75) Inventor: James L. Kroening, Dakota Dunes, SD (US)

(73) Assignee: Spotware Technologies, Inc., Poway, CA (US)

( * ) Notice: Subject to any disclaimer, the term of this patent is extended or adjusted under 35 U.S.C. 154(b) by 924 days.

(21) Appl. No.: 10/423,066

(22) Filed: Apr. 25, 2003

(65) Prior Publication Data

US 2004/0215590 A1 Oct. 28, 2004

(51) Int. Cl.
G06F 9/46 (2006.01)
G06F 15/16 (2006.01)
G06F 15/173 (2006.01)

(52) U.S. Cl. .................. 718/102; 718/104; 709/201; 709/226

(58) Field of Classification Search .......... 718/100–108; 709/201–226
See application file for complete search history.

(56) References Cited

U.S. PATENT DOCUMENTS

| | | | | |
|---|---|---|---|---|
| 5,881,284 | A * | 3/1999 | Kubo | 718/100 |
| 6,070,190 | A | 5/2000 | Reps et al. | |
| 6,243,716 | B1 | 6/2001 | Waldo et al. | |
| 6,338,147 | B1 | 1/2002 | Meth et al. | |
| 6,393,583 | B1 | 5/2002 | Meth et al. | |
| 6,401,216 | B1 | 6/2002 | Meth et al. | |
| 6,415,333 | B1 | 7/2002 | Vaell | |
| 6,421,704 | B1 | 7/2002 | Waldo et al. | |
| 6,434,594 | B1 | 8/2002 | Wesemann | |
| 6,446,126 | B1 | 9/2002 | Huang | |
| 6,597,956 | B1 * | 7/2003 | Aziz et al. | 700/3 |
| 7,010,596 | B2 * | 3/2006 | Bantz et al. | 709/224 |
| 7,065,764 | B1 * | 6/2006 | Prael et al. | 718/102 |
| 7,093,004 | B2 * | 8/2006 | Bernardin et al. | 709/219 |
| 7,185,046 | B2 * | 2/2007 | Ferstl et al. | 709/201 |
| 2004/0019624 | A1 * | 1/2004 | Sukegawa | 709/201 |
| 2004/0044718 | A1 * | 3/2004 | Ferstl et al. | 709/200 |
| 2004/0093381 | A1 * | 5/2004 | Hodges et al. | 709/204 |

(Continued)

OTHER PUBLICATIONS

Kubicek et al., "Dynamic Allocation of Servers to Jobs in a Grid Hosting Enviroment", BT Technology Journal, vol. 22, No. 3, 2004, pp. 251-260.*

(Continued)

*Primary Examiner*—Meng-Ai An
*Assistant Examiner*—Jennifer N To
(74) *Attorney, Agent, or Firm*—Pearne & Gordon LLP

(57) ABSTRACT

A method is disclosed for assigning a job to grid computers on a computing grid that includes collecting information from the grid computers about attributes of the computer, grouping the computers into groups based upon the attributes, receiving a job from a customer, determining the attributes needed to perform the job, comparing the attributes needed to perform the job to the attributes of the groups, and submitting the job to at least one of the grid computers of the group having the needed attributes. Also disclosed is a method of reporting progress of performance of a job by a grid computer, which includes receiving a job by the grid computer, initiating performance of the job on the grid computer, periodically communicating a current status of the performance of the job on the grid computer, and returning results of the performance of the job to the grid manager.

15 Claims, 6 Drawing Sheets

U.S. PATENT DOCUMENTS

| | | | |
|---|---|---|---|
| 2004/0098606 A1* | 5/2004 | Tan et al. | 713/200 |
| 2004/0225711 A1* | 11/2004 | Burnett et al. | 709/201 |
| 2005/0071843 A1* | 3/2005 | Guo et al. | 718/101 |
| 2006/0294238 A1* | 12/2006 | Naik et al. | 709/226 |

OTHER PUBLICATIONS

Maheswaran et al., "Metagrid: A Scalable Famework for Wide-Area Service Deployment and Management", IEEE, 2002, pp. 1-8.*

Buyya et al., "Architectural Models for Resource Management in the Grid", Monash University, 2001.*

The Globus Heartbeat Monitor Specification v1.0 fp.globus.org/hbm/hearteat_spec.html.

The Globus Project: A Status Report Foster and Kesselman, 1998.

DataGrid—WP01—Report on Current Technology Anglano, Ferrari, Giacomini, et al. Mar. 21, 2001.

SunCluster Grid Architeture May 2002.

Fundamentals of Grid Computing Redbooks Paper, IBM Corp Berstos. 2-2.

* cited by examiner

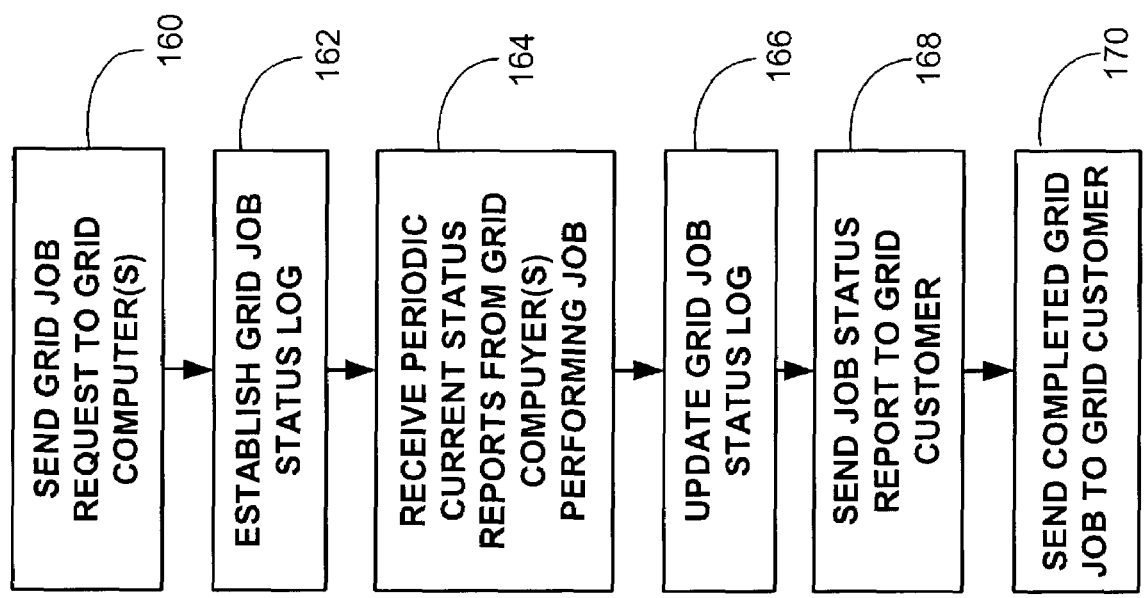

SYSTEM FOR ASSIGNING AND MONITORING GRID JOBS ON A COMPUTING GRID

BACKGROUND OF THE INVENTION

1. Field of the Invention

The present invention relates to grid computing systems and more particularly pertains to a system for assigning and monitoring grid jobs on a computing grid.

2. Description of the Prior Art

Grid computing, which is sometimes referred to as distributed processing computing, has been proposed and explored as a means for bringing together a large number of computers of wide ranging locations and often disparate types for the purpose of utilizing idle computer processor time and/or unused storage by those needing processing or storage beyond their capabilities. While the development of public networks such as the Internet has facilitated communication between a wide range of computers all over the world, grid computing aims to facilitate not only communication between computers by also to coordinate processing by the computers in a useful manner. Typically, jobs are submitted to a managing entity of the grid system, and the job is executed by one or more of the grid computers making up the computing grid.

However, while the concept of grid computing holds great promise, the execution of the concept has not been without its challenges. One challenge associated with grid computing is matching grid jobs to the most appropriate grid computers on the computing grid and then tracking the progress of those grid jobs. Another challenge is tracking the many grid jobs that may simultaneously be running on various grid computers of the computing grid.

Grid jobs submitted to the computing grid may or may not have special requirements for the grid computers that perform the job. If there are special requirements, the grid manager must be informed of those requirements and then must sift through the profiles of the available grid computers to determine if that are any computers that meet the requirements, and if so, which of those computers meet the requirements. This can be time consuming, especially if there are a relatively large number of jobs that have special requirements, and thus can slow down the handling of the job before it even reaches a grid computer to perform the job.

Further, due to the desire to make the performance of the various grid operations on a grid computer as unobtrusive as possible to the primary user and primary functions of the grid computer, there may be a significant period of time before a grid job is begun, or an interruption that lasts for a significant period of time, and thus predicting the time when the grid job will be completed is difficult. The grid manager or grid job scheduler may query the grid computer as to the status of the grid job, but this may make grid operations on the grid computer more obtrusive and increase the traffic on the linking network. Further, if the network connection of the grid computer is intermittent, the grid manager may not be able to adequately time the queries to the periods when the network connection is present, and this may lead to a lack of response by the grid computer that confuses the grid manager as to the job status.

In view of the foregoing, it is believed that there is a significant need for a system that effectively matches the needs of the grid job requests to the abilities of the grid computers, and then effectively monitors the progress of the performance of the grid job.

SUMMARY OF THE INVENTION

In view of the foregoing, the present invention discloses a system for assigning and monitoring grid jobs on a computing grid.

One aspect of the invention involves a method and system for assigning a grid job to grid computers on a computing grid for performing the grid job. The method implementation comprises collecting information from the grid computers about attributes of the grid computer, grouping the grid computers of the computing grid into groups of grid computers based upon the attributes of the grid computers, receiving a grid job request from a grid customer, determining the attributes needed to perform the grid job request, comparing the attributes needed to perform the grid job to the attributes of the groups of the grid computers, and submitting the grid job to at least one of the grid computers of the group of grid computers having the attributes needed to perform the grid job. The system includes means for performing the steps of the method implementation.

Another aspect of the invention involves a method and system of reporting progress of performance of a grid job by a grid computer of a computing grid. The method implementation includes receiving a grid job request by the grid computer from a grid manager, initiating performance of the grid job request on the grid computer, periodically communicating a current status of the performance of the grid job request on the grid computer to the grid manager, and returning results of the performance of the grid job request to the grid manager. The system includes means for performing the steps of the method implementation.

Advantages of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred implementations of the invention.

BRIEF DESCRIPTION OF THE DRAWINGS

The invention will be better understood and objects of the invention will become apparent when consideration is given to the following detailed description thereof. Such description makes reference to the annexed drawings wherein:

FIG. 6 is a schematic flow diagram of the monitoring process from the standpoint of the grid manager.

DESCRIPTION OF PREFERRED EMBODIMENTS

Figure 1:
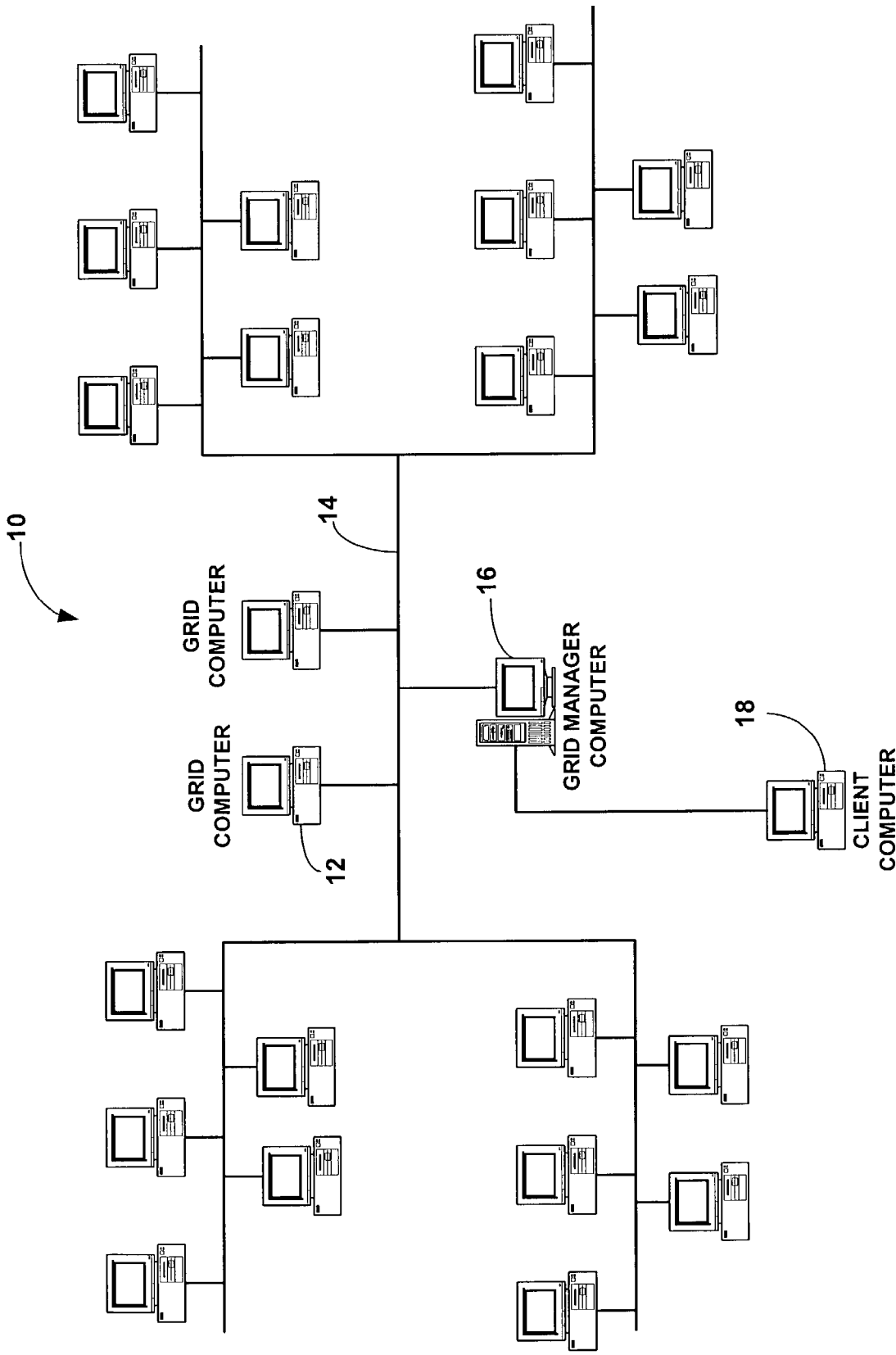
FIG. 1 is a schematic diagram of a computing grid system suitable for implementing the system of the present invention for signing and monitoring grid jobs on a computing grid.
Figure 2:
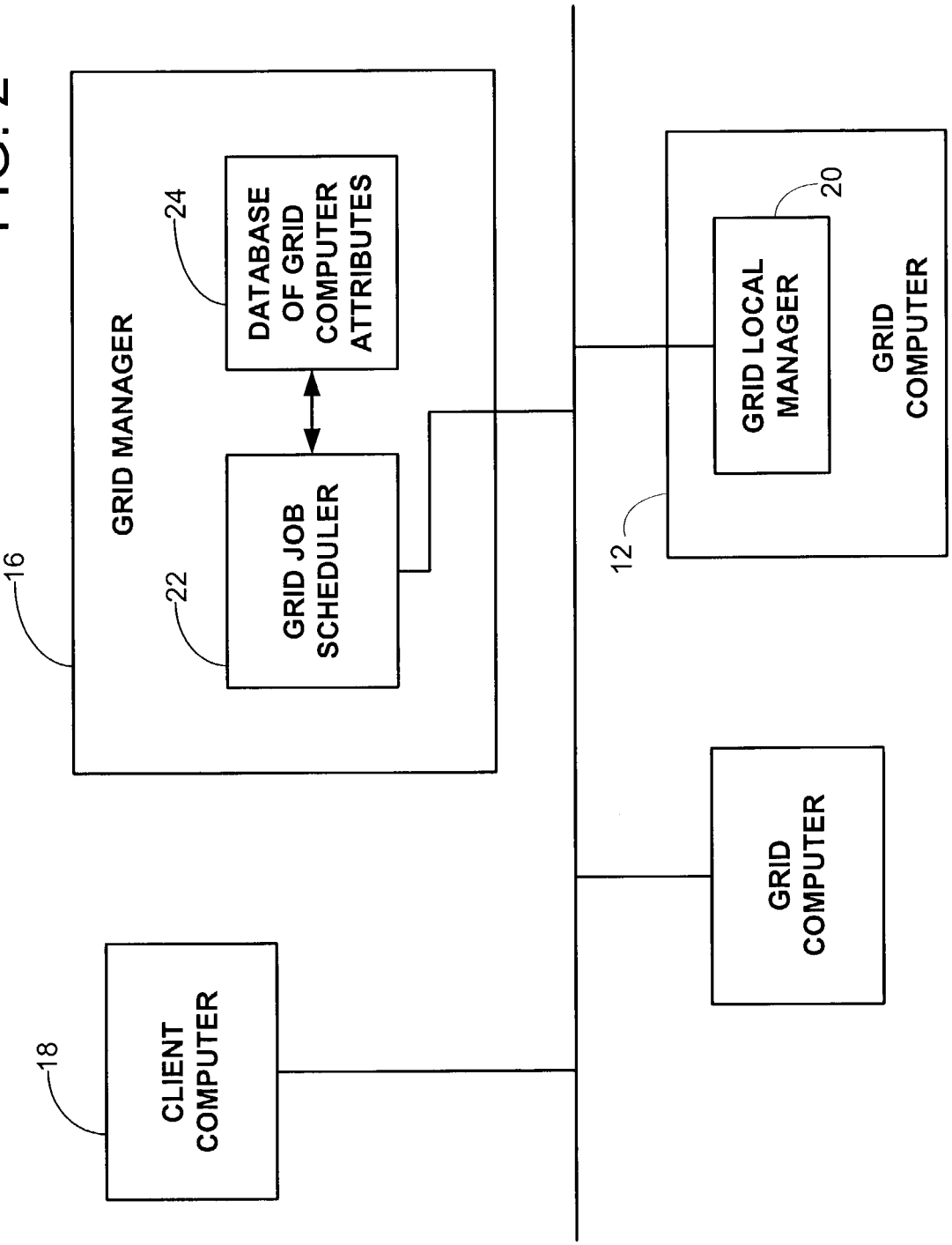
FIG. 2 is a schematic diagram showing greater detail of various elements of FIG. 1.

With reference now to the drawings, and in particular to FIGS. 1 through 6 thereof, a system for assigning and monitoring grid jobs on a computing grid system that embodies the principles and concepts of the present invention will be described.

Initially, for the purposes of clarity in this description, terminology used throughout this description will be defined so as to minimize any confusion with respect to the disclosure of the invention, with the understanding that various other names may be given to the disclosed elements, and this terminology is not intended to be construed as limiting the invention.

A grid system 10 (see FIG. 1) may comprise a plurality of grid computers 12 linked or interconnected together for communication therebetween (such as by a linking network 14), with a grid manager computer 16 designated to administer the grid system. In operation, a client computer 18 submits a job to the grid system 10, typically via the grid manager computer 16 which initially receives jobs for processing by the grid system. The client computer 18 may be one of the grid computers 12 on the grid system, or may be otherwise unrelated to the grid system 10. Each of the grid computers 12 may be provided with a grid agent or local manager application 20 that is resident on the grid computer for communicating and interfacing with the grid manager 16 and administering local grid operations on the grid computer (see FIG. 2). The grid manager 16 may be a computing grid server adapted for accepting jobs from the client computer 18, assigning and communicating the job to one of the grid computers 12, receiving results from the grid computer and communicating the final result back to the client computer. The grid manager 16 may be provided with a grid job scheduler application 22 that assigns grid jobs to the grid computers of the computing grid and then monitors the progress of the grid job until completion. Optionally, a grid job may be submitted to more than one of the grid computers 12 of the system 10, and in that event the grid manager computer 16 may divide up or apportion the job into more than one subsidiary jobs, or tasks. The grid manager 16 then transmits the tasks to more than one grid computer 12 to be completed, and the results are returned to the grid manager, which correlates the results into a final result, and transmits them to the client computer 18.

In one embodiment of the invention, at least one of the grid computers 12 is located physically or geographically remote from at least one of the other grid computers, and in another embodiment, many or most of the grid computers are located physically or geographically remote from each other. The grid computers 12 and the grid manager computer 16 are linked in a manner suitable for permitting communication therebetween. The communication link between the computers may be a dedicated network, but also may be a public linking network such as the Internet.

Figure 3:
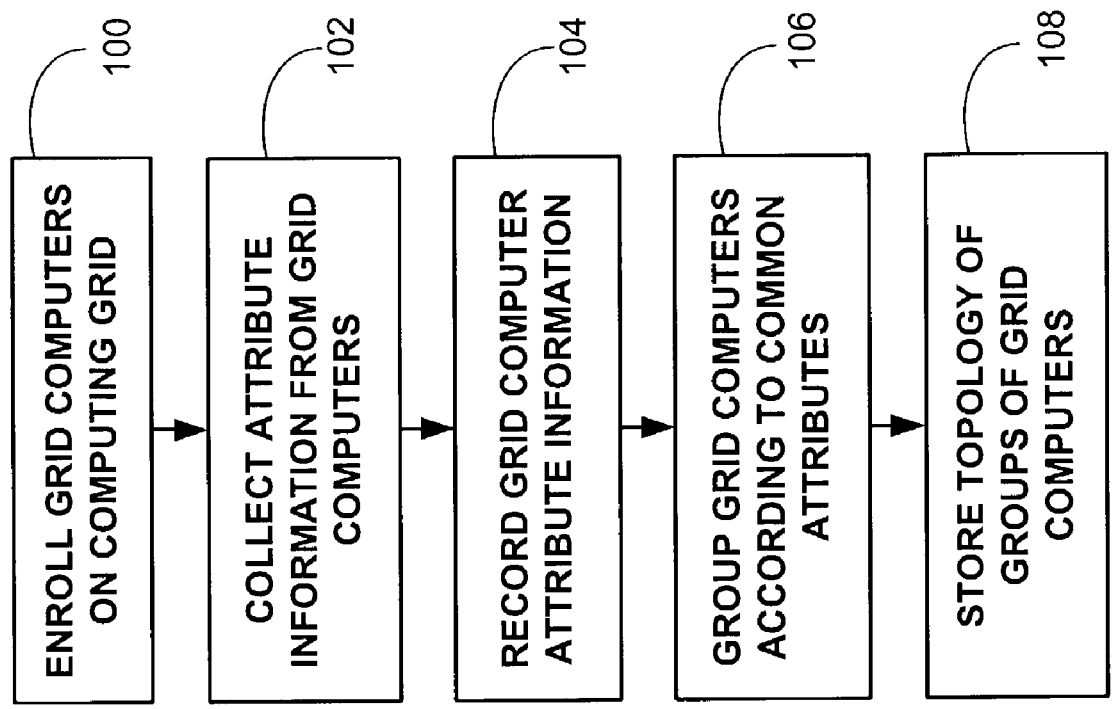
FIG. 3 is a schematic flow diagram of an enrollment process that may be employed in the present invention for collecting information about grid computers on the computing grid system.

In one aspect of the invention, a method is provided for steering or directing or assigning a grid job to the grid computers on a computing grid with capabilities that are highly suitable for performing the grid job (FIG. 3). This aspect of the invention may be performed by the grid job scheduler 22 application that resides on the grid manager. Initially, computers are enrolled or registered on the computing grid (block 100) prior to receiving jobs from the computing grid. As part of the registration process, the grid manager may collect, from the computers being added to the computing grid, information regarding various attributes about the computers (block 102). These attributes or parameters or characteristics may include the relative security level of the grid computers, the relative performance level of the grid computers, the relative availability level of the grid computers, applications resident on the grid computers such as operating system software, available amounts of memory and storage, and the like. The information about the attributes of the grid computers may be recorded on a database 24 that may be associated with the grid job scheduler on the grid manager (block 104) so that the information may be readily accessed when grid job requests are being handled.

Significantly, the grid computers of the computing grid may be grouped into a number of groups that each includes a plurality of grid computers (block 106). Each of the grid computers may be logically associated with one or more of the groups based upon the sharing of similar types or levels of one or more of the attributes reported to the grid manager during the registration process. This commonality may include having the same or similar levels of one or more of the various attributes recorded in the database so that the grid scheduler knows that each of the grid computers belonging to a particular group share the same attribute that is associated with the grouping, without having to check the profiles of each of the grid computers individually. For example, one grouping could include grid computers meeting a minimum level of security, while another grouping could include grid computers employing a particular operating system or specialized software application. Other groupings may include a relatively higher level of processor performance or availability to the grid, so that jobs submitted to computers of those groups will most likely be performed relatively quicker than jobs submitted to groups of computers with slower processors or less availability. The groupings are created logically by the grid manager, and are not the result of any physical connection or grouping of the computers, which may be located in locations highly remote to each other. A logical topology of each of the groupings of grid computers may be stored on the database (block 108) for future access by the grid manager or the grid scheduler. The topologies of the groupings may not be static, and may be updated as computers are added or removed from the computing grid, or as the configuration of the grid computers is altered.

Figure 4:
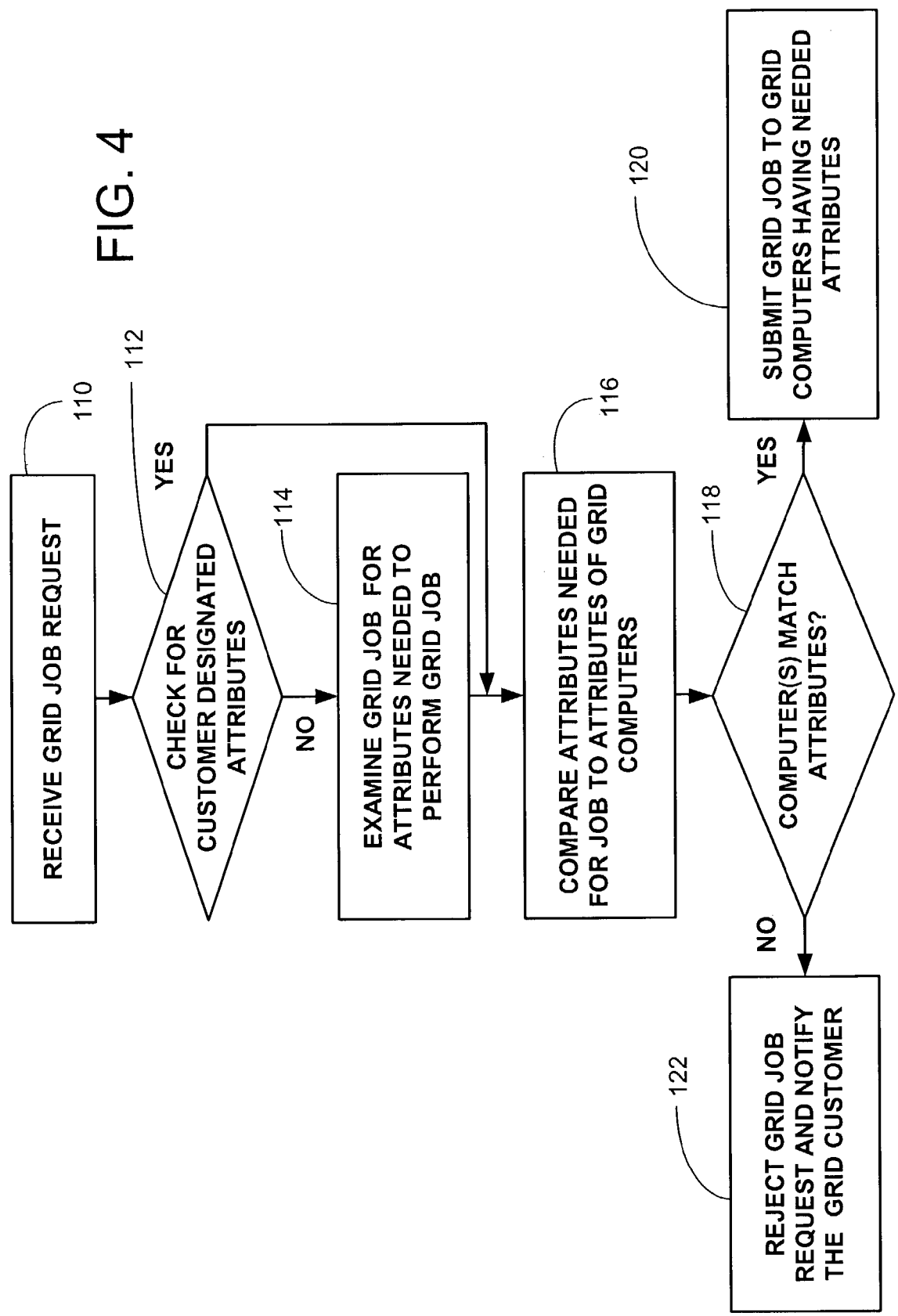
FIG. 4 is a schematic flow diagram of an assignment process for assigning grid jobs to one or more grid computers based upon the attributes required for performing the grid job and the attributes of the grid computers.

As illustratively shown in FIG. 4, when a grid job request that includes a grid job is received from a grid customer (block 110), the grid job request is checked to see if the grid customer has designated any particular attributes for the grid computers performing the job (block 112). If no attributes have been designated by the customer, the grid job of the request is examined to determine the attributes that are needed or may be needed to perform the grid job (block 114). The determination of the attributes needed or necessary to perform a grid job may be determined by the grid manager (or other grid entity) after analyzing the grid job, or may be designated by the grid customer and included as part of the grid job request. Once the attributes are designated or determined, the attributes for performing the grid job are compared to the attributes of the grid computers of the computing grid (block 116), and particularly to the attributes shared by computers of any of the groupings of computers. Once it is determined if any computers on the computing grid have the attributes needed to perform the grid job (block 118), the grid job may be submitted to one or more of the grid computers of the computing grid that have the attributes needed to perform the grid job (block 120), and portions or parts of the grid job may be directed to a number of grid computers of one of the groupings. If it is determined that none of the grid computers have the attributes, then the grid job request is rejected (block 122) and the grid customer may be notified of the rejection.

Significantly, the topologies of the groupings of the grid computers recorded on the database provide a guide as to which grid computers on the computing grid are most suitable for performing the grid job based upon the attributes shared by the grid computers of the particular groupings. The grid job scheduler may then avoid having to needlessly spend time comparing the attributes needed for performing the grid job to the attributes of each and every grid computer on the computing grid to determine suitable targets for the grid jobs. Further, subsequent similar grid job requests from the same grid customer may optionally be directed to the same grouping of computers without having to reanalyze the later grid job requests.

Figure 5:
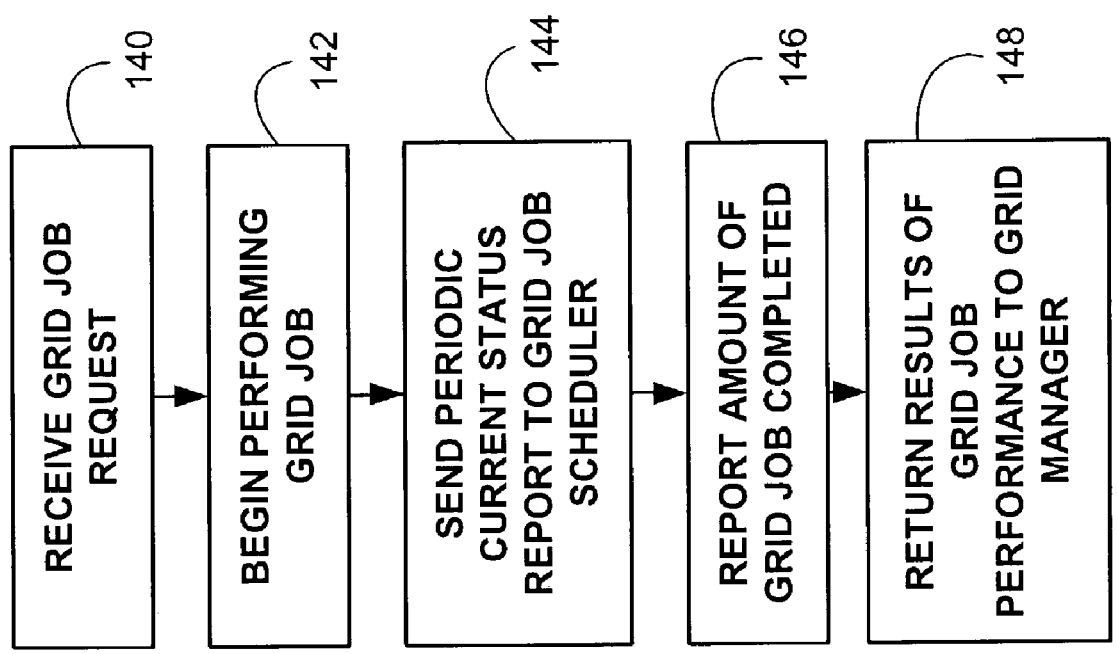
FIG. 5 is a schematic flow diagram of a monitoring process from the standpoint of the grid computer performing the grid job.

In another aspect of the invention, a method of reporting the progress of the performance of a grid job by one or more grid computers of the computing grid is provided (see FIGS. 5 and 6). The local manager 20 (or grid agent) application of each of the grid computers may be enabled to communicate with the computing grid and conduct local operations of the computing grid, such as receiving grid job requests and returning to the grid manager the results of the performance of the grid job. When a grid job request is received from the grid job scheduler on the grid manager (block 140) by the local manager application on the grid computer, performance of the grid job may be initiated (block 142) by the grid computer. The performance of the grid job may include for example processing data, but may also include other tasks such as providing temporary storage for data. However, the performance of the grid job may be delayed, and may be delayed for a significant period of time, if the grid computer is otherwise engaged in the primary functions of the computer.

Significant to this aspect of the invention, the local manager application 20 keeps the grid manager informed of the progress of the performance of the grid job by communicating with the grid scheduler 22 periodically to report a current status of the grid job (block 144). The communication may occur even if the performance of the grid job has not begun, or even if the performance has not been completed. The communication between the local manager 20 and the grid job scheduler 22 may include sending a status message to the grid manager with the current status of the performance of the grid job. The status message may include information such as an amount or percentage of the job that has been completed or that remains incomplete (block 146). Preferably, the status message is relatively short and compact in size to minimize the imposition of on the grid computer and also on the grid manager, which may be handling such periodic messages from a multitude of computers on the computing grid. A short message also minimizes the traffic imposed upon the linking network. It is also desirable that the sending of the messages to the grid job scheduler is not dependent upon receiving inquiries from the grid job scheduler, or other computing grid entity, so that the local manager volunteers this information to the grid scheduler. This primarily one-way mode of communication lessens the quantity of message traffic between the grid computer and the grid manager, and also permits the grid scheduler to concentrate its inquiries on only the grid job assignments where status messages are the tardiest.

The communication of the job status messages may occur periodically during the performance of the grid job by the grid computer, and may even occur during periods of inactivity due to use of the grid computer by primary user to inform the grid scheduler that the grid job is alive and awaiting processor time to complete the job. The intervals between transmissions of the periodic messages may also be varied, such as by programming of the local manager by the grid scheduler, so that the grid job scheduler may be kept adequately updated on the progress of outstanding grid job requests until the grid job results are returned to the grid manager (block 148), but also so that the status messages are not too frequently sent to the scheduler. Further, if the grid scheduler has set the frequency for status messages, it is able to determine when the status messages are due, and when the messages are missed indicating that the performance of the grid job may have become hung up or terminated.

On the part of the grid manager (see FIG. 6), after a grid job is sent to one or more grid computers of the computing grid (block 160), a job status log may be created and maintained on the grid manager of the computing grid (block 162). The grid scheduler or other responsible entity on the computing grid receives the periodic message reports from the local manager application on the grid computer or computers performing the grid job (block 164), and the job status log is updated based upon the periodic reports (block 166). The computing grid may inform the grid customer, which submitted the grid job, of the status of the grid job based upon the information maintained in the job status log derived from the periodic status messages (block 168). The process of informing the grid customer may include sending a number of periodic update messages to the grid customer prior to a time of completion of the grid job. The periodic messages to the grid customers may include reporting what portion or percent of the grid job has been completed or remains incomplete. Also, the periodic messages may also include other pertinent information about the performance of the grid job, including a report of a number of times that the performance of the grid job has been attempted.

Upon completion of the grid job, the grid customer is informed when the grid job is complete and supplied with the results of the job (block 170).

The foregoing is considered as illustrative only of the principles of the invention. Further, since numerous modifications and changes will readily occur to those skilled in the art in view of the disclosure of this application, it is not desired to limit the invention to the exact embodiments, implementations, and operations shown and described. Accordingly, all equivalent relationships to those illustrated in the drawings and described in the specification, including all suitable modifications, are intended to be encompassed by the present invention that fall within the scope of the invention.

I claim:

1. A method for assigning a grid job to grid computers on a computing grid for performing the grid job, comprising:

collecting information by a grid manager from the grid computers about one or more attributes of the grid computers;

grouping the grid computers of the computing grid by the grid manager into groups of grid computers based upon the collected information about the attributes of the grid computers such that each of the grid computers of a group include the one or more attributes;

receiving a grid job request from a grid customer;

determining by the grid manager at least one attribute needed to perform the grid job request;

comparing by the grid manager the at least one attribute needed to perform the grid job to the one or more attributes of the groups of the grid computers; and submitting by the grid manager the grid job to at least one of the grid computers of the group of grid computers having the at least one attribute needed to perform the grid job;

wherein one of the attributes of the grid computers comprises availability of a grid computer relative to other grid computers of the computing grid, and wherein another one of the attributes comprises a relative speed of a processor of the grid computer.

2. The method of claim 1 wherein grouping the grid computers includes storing a topology of each of the groups of grid computers on a database.

3. The method of claim 1 wherein grouping the grid computers into groups includes grouping grid computers together having similar levels of one of the attributes of the grid computers.

4. The method of claim 1 additionally comprising updating the groups of grid computers when a grid computer is added to or removed from the computing grid.

5. The method of claim 1 wherein one of the attributes of the grid computers of one group of grid computers comprises a type of operating system of a grid computer.

6. The method of claim 1 wherein collecting information from the grid computers includes recording on a database the information about the attributes of the grid computers.

7. The method of claim 1 wherein the steps of collecting, grouping and comparing are performed by a grid manager computer for managing the computing grid.

8. The method of claim 1 wherein a grid computer of the grid computers of the computing grid is associated with more than one of the groups of grid computers of the computing grid.

9. The method of claim 1 further including matching one or more attributes of the grid job to one or more attributes of a group of the grid computers.

10. The method of claim 1 wherein the one or more attributes of the grid computers further comprise at least one member of the group consisting of:
a relative amount of memory available on the grid computer for performing a grid job, a relative amount of storage available on the grid computer for performing a grid job, and a relative security level of the grid computer for performing a grid job.

11. The method of claim 1 wherein grouping includes grouping together in a said group the grid computers of the computing grid having a similar type of an attribute in common.

12. The method of claim 1 wherein the one or more attributes of the grid job is not a size of the grid job.

13. A system implemented on a computing grid system for assigning a grid job to grid computers on a computing grid for performing the grid job, comprising:
means for collecting information from the grid computers about one or more attributes of the grid computers;
means for grouping the grid computers of the computing grid into groups of grid computers based upon the collected information about the one or more attributes of the grid computers such that each of the grid computers of a group include the one or more attributes;
means for receiving a grid job request from a grid customer;
means for determining one or more attributes needed to perform the grid job request;
means for comparing the one or more attributes needed to perform the grid job to the one or more attributes of the groups of the grid computers; and
means for submitting the grid job to at least one of the grid computers of the group of grid computers having the one or more attributes needed to perform the grid job;
wherein one of the attributes of the grid computers comprises availability of a grid computer relative to other grid computers of the computing grid, and wherein another one of the attributes comprises a relative speed of a processor of the grid computer.

14. The system of claim 13 wherein the means for grouping the grid computers into groups includes means for grouping grid computers together having similar levels of at least one of the attributes of the grid computers.

15. The system of claim 13 wherein one of the attributes of the grid computers comprises a type of operating system for the grid computers.

* * * * *